US006847635B1

(12) United States Patent
Beser

(10) Patent No.: US 6,847,635 B1
(45) Date of Patent: Jan. 25, 2005

(54) METHOD TO TRANSMIT SILENCE COMPRESSED VOICE OVER IP EFFICIENTLY IN DOCSIS CABLE NETWORKS

(75) Inventor: Nurettin B. Beser, Arlington Heights, IL (US)

(73) Assignee: 3Com Corporation, Santa Clara, CA (US)

( * ) Notice: Subject to any disclaimer, the term of this patent is extended or adjusted under 35 U.S.C. 154(b) by 585 days.

(21) Appl. No.: 09/597,522

(22) Filed: Jun. 20, 2000

(51) Int. Cl.[7] .......................... H04L 12/66; H04L 12/28
(52) U.S. Cl. ................... 370/352; 370/356; 370/389; 725/111
(58) Field of Search ................. 370/352–357, 370/347, 345, 389, 465, 346; 725/111; 704/214; 348/14.01, 14.04

(56) References Cited

U.S. PATENT DOCUMENTS 6,236,653 B1 * 5/2001 Dalton et al. ............... 370/352

6,570,855 B1 * 5/2003 Kung et al. .................. 370/237

* cited by examiner

*Primary Examiner*—Duc Ho
(74) *Attorney, Agent, or Firm*—McGlew and Tuttle, P.C.

(57) ABSTRACT

A method to use the data packet carrying ability of cable TV networks as described in DOCSIS to accurately and quickly transmit a voice call from a cable user to another user over a cable TV cable. The cable telephone, or cable modem, is given the ability to detect when voice activity from the subscriber is above and below a predetermined value. When the cable modem has voice activity, the cable modem knows that it will have a continuous stream of voice data packets which need to be sent very quickly and very accurately to the CMTS. Therefore, the cable modem requests a periodic stream of time slots from the CMTS. When the cable modem detects no voice activity or a silence period from the subscriber, the cable modem indicates that the periodic stream of time slots is no longer needed and the CMTS stops providing the periodic stream of time slots. When voice activity of the subscriber resumes, the cable modem again request the periodic stream of time slots, and transmits the voice data packets or cells in these time slots.

14 Claims, 6 Drawing Sheets

| EH Element Fields | | Usage | Size |
|---|---|---|---|
| EH_TYPE | | Service Flow EH_TYPE = 5 | 4 bits |
| EH_LEN | | Length of EH_VALUE = 2 | 4 bits |
| EH_VALUE | 0 | Indicates no payload header suppression on current packet. | 8 bits [always present] |
| | 1-255 | Payload Header Suppression Index (PHSI) | |
| | | Queue Indicator | 1 bit |
| | | Active Grants | 7 bits |

METHOD TO TRANSMIT SILENCE COMPRESSED VOICE OVER IP EFFICIENTLY IN DOCSIS CABLE NETWORKS

FIELD OF THE INVENTION

The present invention relates to transmitting computer network data over a cable TV network, and in particular to a method and system for digitally transmitting voice data along with the computer data.

BACKGROUND OF THE INVENTION

Many residential communities have been wired with coaxial cable for delivery of TV signals from a cable TV station. The cable TV station is able to transmit a large number of cable TV channels through the coaxial cable to the homes connected to the coaxial cable. The cable TV cable has a large amount of bandwidth, and very often the cable TV station does not use all of the bandwidth of the cable to transmit the cable TV signals. Cable TV networks therefore often have excess or unused capacity on their cable TV cables.

Access to the Internet can be achieved in many different ways. The most popular, and usually the least expensive, is through a telephone connection between an Internet service provider (ISP) and a residential user. The Internet is becoming more and more popular and the amount of data available on the Internet is increasing. Residential users are requesting larger and larger amounts of data from the Internet. The data carrying ability of typical telephone connections is limited and many residential users desire a faster connection to the Internet than can be provided by a typical telephone connection. Cable TV companies have taken advantage of the extra capacity of their cable networks and have modified their cable systems to connect individual residential users to the Internet through their cable system. A description of a cable TV system which can also provide an Internet connection is provided in the publication Data-Over-Cable-Service-Interface-Specifications (DOCSIS).

There exists an interest in using the Internet to conduct real time voice conversations between two separate parties. These voice conversations would be handled much like telephone calls handled by the existing telephone companies. However the existing telephone system and the Internet operate very differently. The telephone system provides a dedicated connection between two persons during a voice call. When the voice call is initiated, the dedicated connection is created, and after the voice call has been terminated, the connection is also terminated. The Internet on the other hand, divides information into packets or cells. These packets or cells are individually sent out onto the network, mixed with other packets or cells and then individually switched from one path to another by switches in the network until the packet reaches its final destination. A voice call over the Internet, creates a large number of packets which must be delivered very quickly and very accurately. This places a high burden on the computer network. Voice calls also have typically large amounts of silence or quite periods, such as when one person is listening and not talking, or when a person pauses between words or sentences. The high speed and high accuracy is not needed during these silence periods.

SUMMARY AND OBJECTS OF THE INVENTION

It is a primary object of the present invention to use the data packet carrying ability of cable TV networks as described in DOCSIS to accurately and quickly transmit a voice call from a cable user to another user over a cable TV cable.

This object is accomplished by providing a cable subscriber with a cable modem connected to a cable. The subscriber can also have their television sets connected to the cable, however this is not necessary. A cable telephone is connected to the cable modem. A personal computer or other workstation can also be connected to the cable modem, and can also be connected in series between the cable telephone and the cable modem, however this is not necessary.

The cable modem receives digital voice packets from the cable telephone. The cable modem can also receive non-voice data packets from the personal computer or other workstation. The cable TV station has a cable modem termination system (CMTS) which controls the signals being sent between the cable TV station and the individual subscribers. When a cable modem has a data packet to send to the CMTS, the cable modem requests a time slot from the CMTS in an upstream channel from the subscriber to the cable station. When the CMTS learns of a request, it provides the cable modem with a time slot. When the cable modem has a voice call, the cable modem knows that it will have a continuous stream of voice data packets which need to be sent very quickly and very accurately to the CMTS. Therefore instead of the cable modem separately requesting a time slot for each voice data packet, the cable modem requests a periodic stream of time slots from the CMTS. The size and frequency of periodic time slots is chosen to fully transmit the voice data packets quickly and accurately.

The cable telephone, or cable modem, or a combination of the two, is given the ability to detect when voice activity from the subscriber is above and below a predetermined value. When voice activity is below this predetermined value, the cable telephone and/or cable modem considers there to be no voice activity and that the subscriber is being silent. When the cable modem detects no voice activity or a silence period from the subscriber, the cable modem indicates to the CMTS that the periodic stream of time slots is no longer needed and the CMTS stops providing the periodic stream of time slots. When voice activity of the subscriber resumes, the cable modem again request the periodic stream of time slots, and transmits the voice data packets or cells in these time slots. The terms "packets" and "cells" are used interchangeably in this specification and represent any data unit that is sent between the cable modem and the CMTS.

The present invention preferably modifies the DOCSIS specification, or works within the framework of the DOCSIS specification in order to provide the starting and stopping of the period stream of time slots. The DOCSIS publication number SP-RFIv1.1-I02-000407 Second Interim Release, Jul. 31, 1999, and SP-RFIv1.1-I04-000407 Fourth Interim Release, Apr. 7, 2000 includes the details of the present invention and is incorporated by reference. In this way, voice transmission from a subscriber to the CMTS can be provided quickly and accurately, while efficiently using the signal capacity of the cable and in existing systems. This is very important when there are many subscribers wishing to send data to the CMTS, especially when that data is voice data. By the present invention starting and stopping the periodic stream of time slots, more capacity is made available to other subscribers. More subscribers can then be serviced on a single cable, and/or faster service can be provided to the other subscribers. All of the data from all of the subscribers on a single line is placed into different time slots on the cable for transmission to the CMTS. If a voice call was made from a subscriber without activity detection, it would require a large number of time slots, even when the subscriber does not have any voice audio to send to the recipient of the voice call. By starting and stopping the periodic stream of time slots granted to a subscriber according to activity, the time slots are not wasted during silence portions of the voice call and those time slots are made available to other subscribers.

Further features of transmitting computer network data over a cable TV network useful in the present invention are described in applicant's co-pending application titled "CABLE MODEM WITH DRIBBLE GRANT ACCESS SYSTEM AND METHOD" having the same inventor and assignee as the present application, and is hereby incorporated by reference.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a table of the format for a UGS header;

DESCRIPTION OF THE PREFERRED EMBODIMENT

Figure 1:
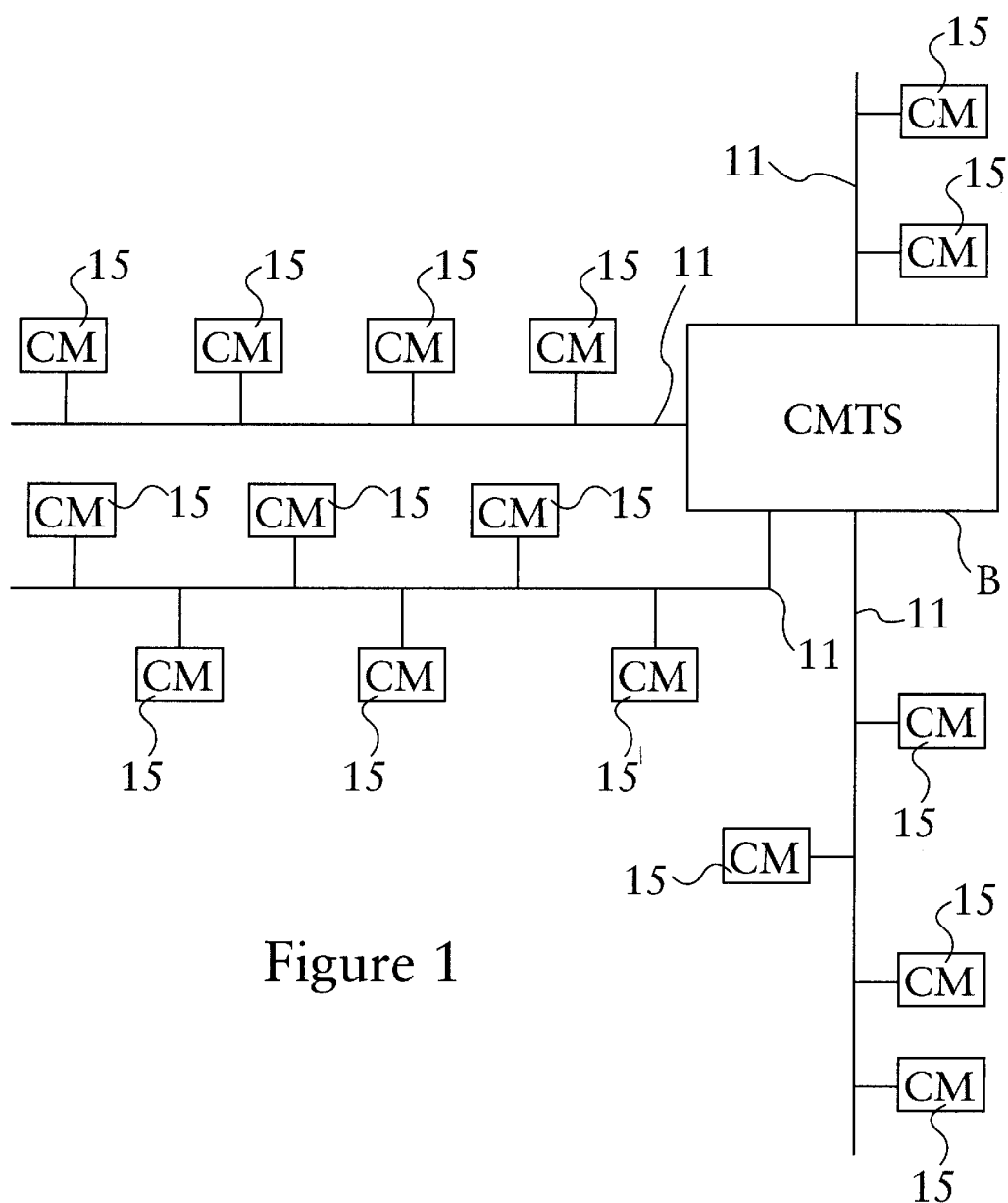
FIG. 1 is a schematic overview of a cable TV system.

Referring to the drawings, in particular to FIG. 1, a cable TV system has a plurality of coaxial cable TV cables 11 which connect to a cable modem termination system (CMTS) 13. Connected to each of the cable TV cables 11 are a plurality of cable modems (CM) 15. Each of the cables 11 have a plurality of downstream channels 17 for delivering the cable TV signals and computer network data, see FIG. 2. The cables 11 also have at least one upstream channel 19 for transferring data from the individual cable modems 15 to the CMTS 13.

The upstream channel 19 and the downstream channels 17 preferably share the same medium, i.e. the same coaxial cable. The preferred embodiment of the present invention is therefore more of a bus system where all of the cable modems 15 have access to the same bus, instead of separate lines or paths for each modem. A plurality of cable modems 15 share a common upstream channel 19. The upstream channel 19 is divided into a plurality of data time slots 21. When a cable modem such as cable modem 1 (CM1) has a data packet to send to the CMTS 13, the cable modem 1 requests a time slot from the CMTS 13. The CMTS grants cable modem 1 a particular time slot 21 in one of the data intervals 23. When the cable modem 1 receives the grant, cable modem 1 places the data packet into the time slot 21 as indicated by the CMTS 13. This procedure is fully described in the DOCSIS specification and therefore no further information is needed for the person of ordinary skill in the art.

When a cable telephone 25 is connected to cable modem 1, and a voice call is initiated, cable modem 1 will determine that it will receive a constant stream of data packets representing the voice audio of the voice call. The cable modem then requests Unsolicited Grant Service (UGS) from the CMTS 13. When the CMTS 13 receives a UGS request, the CMTS 13 grants a periodic stream of time slots 21 to the cable modem 1, for the cable modem to insert the data packets into those time slots 21 of the periodic stream. This reduces the need for cable modem 1 to separately request a time slot 21 for each data packet of the voice call and thus reduces the coordination needed and increases the speed at which data packets can be transmitted to the CMTS 13.

Figure 2:
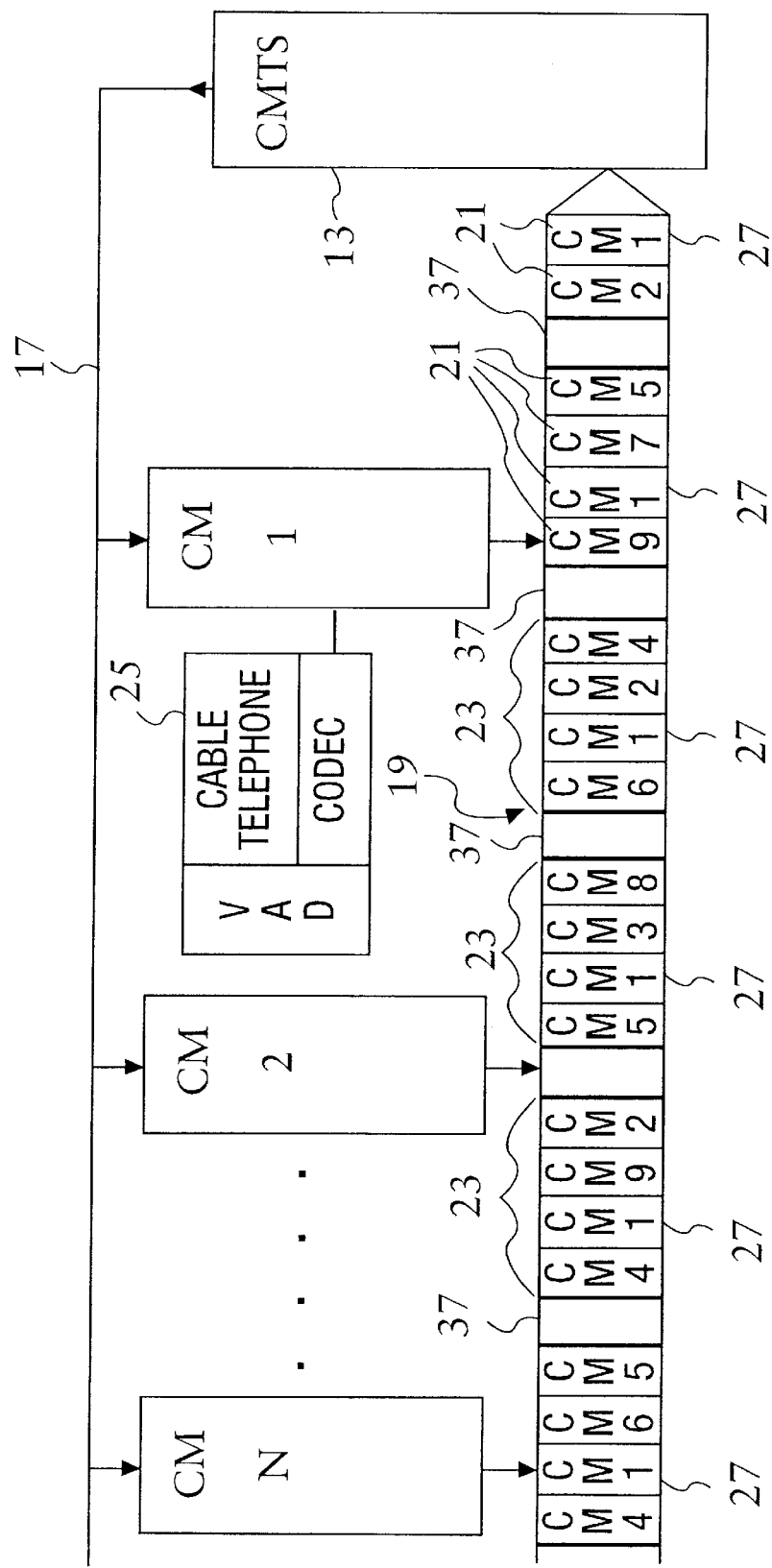
FIG. 2 is a schematic diagram of the connection between the cable modems and the CMTS during voice activity on a cable modem.

In the embodiment shown in FIG. 2, cable modem 1 has requested UGS and the CMTS 13 has responded by indicating that cable modem 1 is allowed to use the second to last data slot 27 in each interval 23. FIG. 2 shows that cable modem 1 is using the second to last time slot 27 of each interval 23 in the upstream channel 19. The requesting of UGS by a cable modem, and a corresponding granting of UGS is fully described in the DOCSIS specification, and no further information is necessary for a person of ordinary skill in the art.

While cable modem 1 is sending voice data packets to the CMTS 3, the remaining cable modules sharing the upstream channel 19 can still request time slots for their own data packets. FIG. 2 shows how the other time slots 21 in the intervals 23 are being used by other cable modems 2–9.

Figure 3:
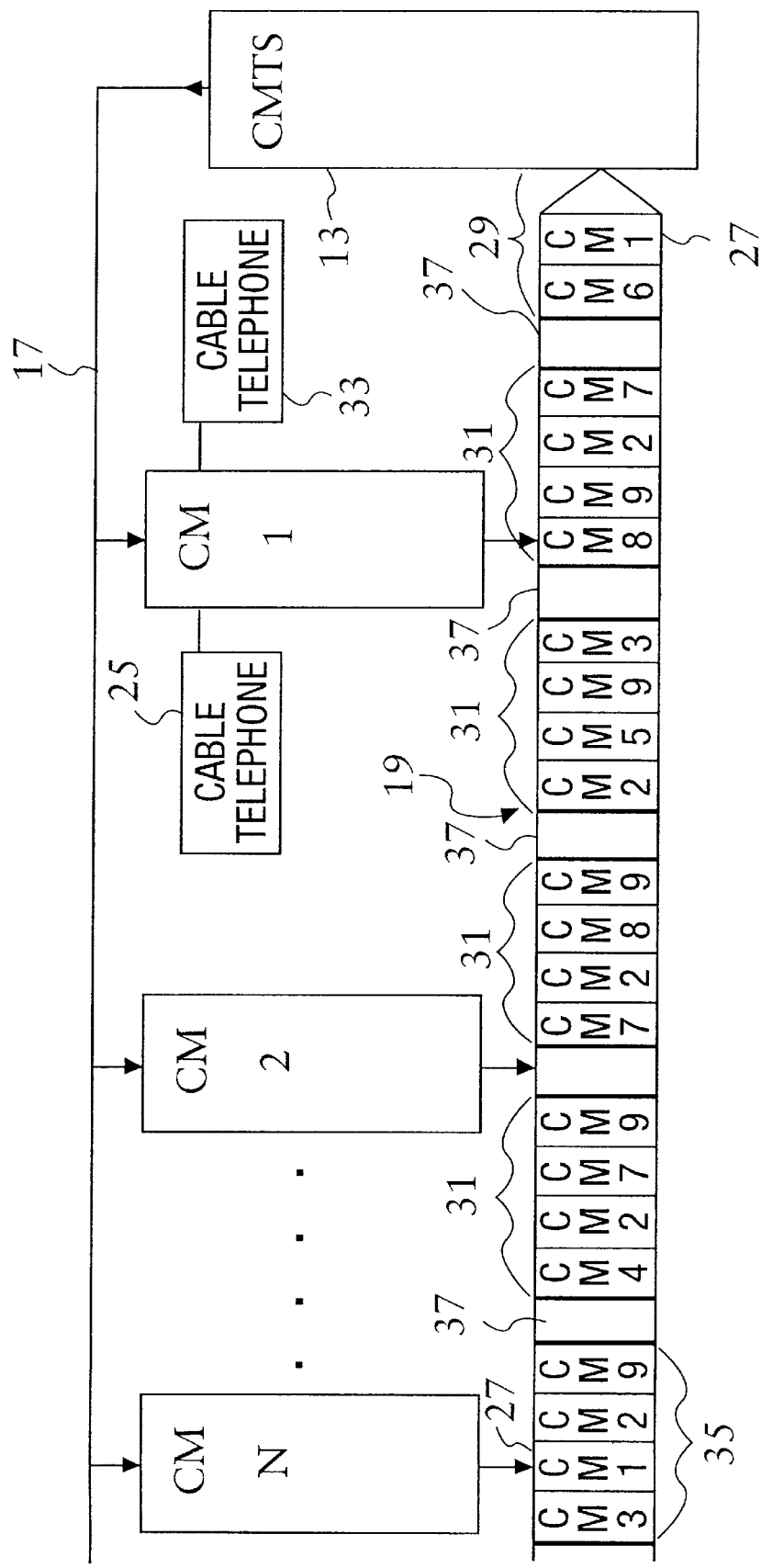
FIG. 3 is a schematic diagram of communication from cable modems to the CMTS during a voice call from a cable modem while there is no voice activity.

FIG. 3 shows the state of the upstream channel 19 just after a voice activity detection (VAD) circuit in cable modem 1 or cable telephone 25 has detected no voice activity or a silence period in the voice audio from the user of cable telephone 25. When cable modem 1 or cable telephone 25 detects a silence period or no voice activity, cable modem 1 indicates to CMTS 13 that UGS is no longer needed. CMTS 13 then assigns the time slots in the intervals 23 according to the need of the other cable modems 15 sharing the upstream channel 19.

In the embodiment of FIG. 3, the last interval 29 providing a time slot for the voice data packets of cable telephone 25 is shown on the right side of FIG. 3. The subsequent intervals 31 do not have a time slot assigned to cable modem 1 for the voice call until activity starts again.

It is possible for a workstation 33, i.e. a personal computer to also be connected to cable modem 1 and to be concurrently sending computer data packets to CMTS 13 for delivery to the Internet. If this were to occur, cable modem 1 would request time slots in the usual fashion, and these time slots would be granted in the usual fashion.

When cable telephone 25 or cable modem 1 again detects voice activity, cable modem 1 requests UGS from the CMTS 13 and a periodic stream of time slots is again granted to cable modem 1. This is shown in the interval 35 on the left side of FIG. 3. The cable modem 1 then again begins to periodically use one of the time slots to send the voice data packets to the CMTS 3. In FIG. 3, the second to last voice slot 27 in interval 35 is again shown as being used by cable modem 1. The same time slot does not need to be shown between different voice activity periods, and can change depending on the availability of time slots selected by the CMTS 13.

By setting forth a procedure where the cable modem 1 or cable telephone 25 blocks the converting of voice audio and transmitting of digital voice packets during periods of silence or no voice activity, additional time slots are made available to the remaining cable modems. These remaining cable modems can then transmit their own voice or computer data packets as required. More cable modems can then be connected to a single cable 11 and/or data packet transfer can be increased on the upstream channel 19.

Figure 4:
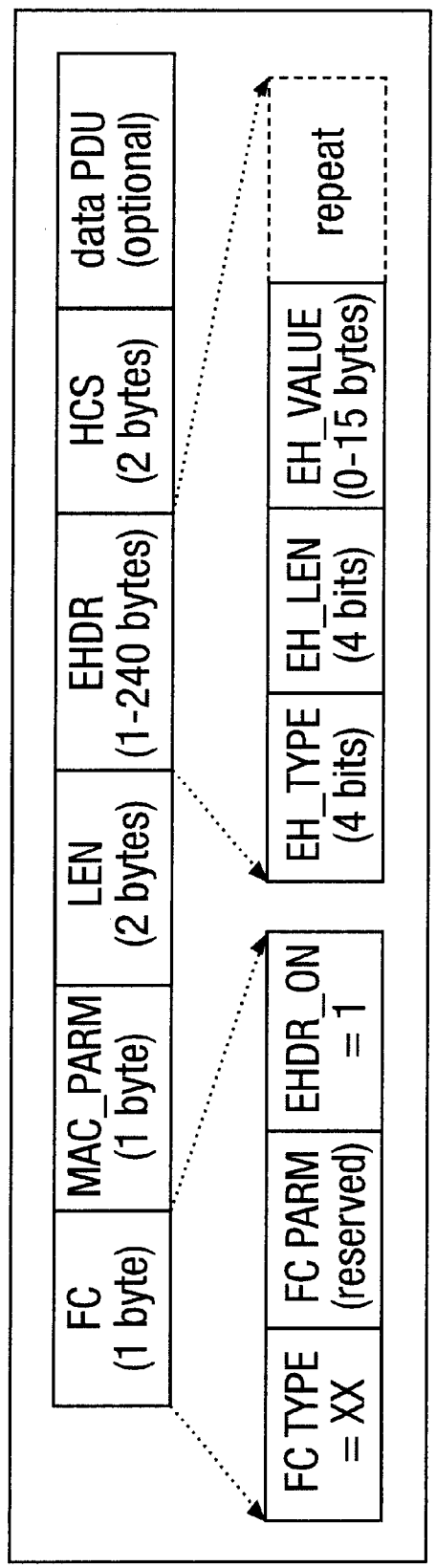
FIG. 4 is a diagram of packet headers.

In a preferred embodiment, the present invention uses UGS (unsolicited grant services) during the non-silence parts of the VoIP (Voice over Internet Protocol) communication and uses the active grant bits of the DOCSIS specification as a measure of showing that there is a need for UGS. The packets sent from the cable modem to the CMTS have extended headers as shown in FIG. 4 and explained in section 6.2.6 of the DOCSIS publication incorporated by reference. One type of header is the Unsolicited Grant Synchronization Header, see section 6.2.6.3.2. When the cable modem is requesting UGS, the number of grants requested for each interval is indicated in this header, in particular in the 7 bits assigned to "Active Grants" shown in FIG. 5 and table 6–16 of the DOCSIS. When UGS is requested for only one telephone conversation the value of the active grant bits is 1 during voice activity, and decrements to 0 when no activity is detected. The CMTS detects the value of the active grant bits and assigns time slots accordingly. When the value of the active grant bits is zero, the CMTS stops all UGS. When voice activity resumes, the cable modem request UGS through the polling procedure, and then continues UGS through the active grant bits.

If several different UGS's are requested, such as for several telephone calls, the value of the active grant bits indicates the total UGS's required, and the CMTS complies. When one telephone call does not have voice activity, the active grant bit value in all the packets sent to the CMTS is decreased, and the CMTS sends one less time slot grant. When voice activity resumes, the active grant bits in the other packets is increased, and the CMTS sends more time slot grants.

If the bytes in the queue of the CM began filling up, the CM would request grants during the contention area, which can also be provided in management slot 37, or when the CM was polled. The contention area being an area of the upstream channel where cable modems can independently transmit packets and compete with other cable modems for sending packets. When the communication enters into the silence suppression phase, the CM does not use the active grant bits for the silence suppressed voice call. When the CMTS sees that the active grant bits are not set, the CMTS understands that the cable modem is in silence suppression phase and ceases the UGS grants. From that point on the CM uses the contention area (or polls) for comfort noise. When the silence ends the CM starts to use active grant bits and as soon as the CMTS sees the active grant bits, the CMTS starts to give UGS.

The same technique is used in the periodically polled case. When the periodic poll is done, and if the packet sent (the size of the packet might be zero) has active grant bits set, then the silence is not on and the periodic poll with reserved grant has to be enabled. If the active grant bits are not set then silence suppression is in place. In this case the CM uses the contention area but it might also used periodic poll with the condition that the grant is not reserved.

Figure 6:
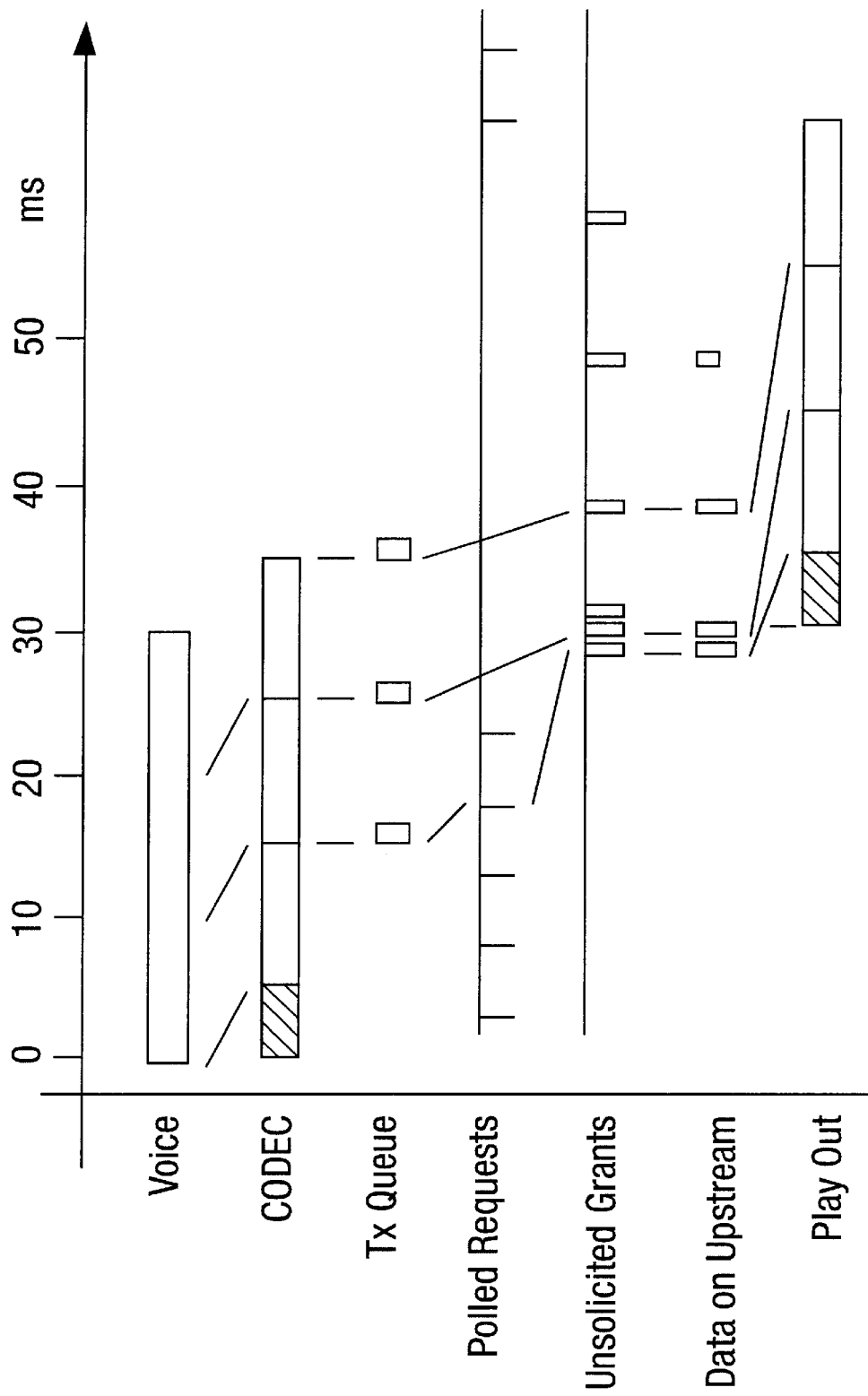
FIG. 6 is a time line showing the relative timing of the different activities during a voice call over a cable TV system.

The Unsolicited Grant Service with Activity Detection (UGS-AD) is an Upstream Flow Scheduling Service Type. Voice Activity Detection (VAD) can also be called Silence Suppression and is a voice technique in which the transmitting CODEC (coder/decoder) sends voice samples only when there is significant voice energy present, as shown in the time line of FIG. 6. The receiving CODEC will compensate for the silence intervals by inserting silence or comfort noise equal to the perceived background noise of the conversation.

The advantage of VAD is the reduction of network bandwidth required for a conversation. It is estimated that 60% of a voice conversation is silence. With that silence removed, that would allow a network to handle substantially more traffic.

Subflows in this context will be described as active and inactive. Both of these states are within the MAC Layer QOS state known as Active. The configuration parameters include all of the normal UGS parameters, plus Nominal Polling Interval and Tolerated Poll Jitter. Explanation of these parameters and their default values are provided in Appendix C of the DOCSIS.

When there is no activity, the CMTS sends polled requests to the CM. When there is activity, the CMTS sends Unsolicited Grants to the CM. The CM indicates the number of grants per interval which it currently requires in the active grant field of the UGSH in each packet of each Unsolicited Grant. The CM may request up to the maximum active Grants per Interval. The CM constantly sends this state information so that no explicit acknowledgment is required from the CMTS. It is left to the implementation of the CM to determine activity levels. Implementation options include:

Having the MAC layer service provide an activity timer per Classifier. The MAC layer service would mark a Subflow inactive if packets stopped arriving for a certain time, and mark a Subflow active the moment a new packet arrived. The number of Grants requested would equal the number of active Subflows.

Having a higher layer service entity such as an embedded media client which indicates activity to the MAC layer service.

When the CM is receiving polled requests and it detects activity, the CM requests enough bandwidth for one Grant per Interval. If activity is for more than one Subflow, the CM will indicate this in the active grant field of the UGSH beginning with the first packet it sends.

When the CM is receiving Unsolicited Grants, then detects new activity, and asks for one more grant, there will be a delay in time before it receives the new grant. During that delay, packets may build up at the CM. When the new Unsolicited Grant is added, the CMTS will burst extra Grants to clear out the packet buildup. When the CM is receiving Unsolicited Grants, then detects inactivity on a Subflow and asks for one less grant, there will be a delay in time before the reduction in Grants occurs. If there has been any build up of packets in the upstream transmit queue, the extra grants will reduce or empty the queue. This is fine, and keeps system latency low. The relationship of which Subflow is getting which specific grant will also change. This effect appears as low frequency jitter that the far end must manage.

When the CM is receiving Unsolicited Grants and detects no activity on any of its Subflows, it will send one packet with the active grants field of the UGSH set to zero grants, and then cease transmission. The CMTS will switch from UGS mode to Real Time Polling mode. When activity is again detected, the CM sends a request in one of these polls to resume delivery of Unsolicited Grants. The CMTS ignores the size of the request and resumes allocating Grant Size grants to the CM.

It is not necessary for the CMTS to separately monitor packet activity since the CM does this already. Worst case, if the CMTS misses the last packet which indicated zero grants, the CMTS and CM would be back in sync at the beginning of the next talk spurt. Because of this scenario, when the CM goes from inactive to active, the CM must be able to restart transmission with either Polled Requests or Unsolicited Grants.

FIG. 4 shows an example of a single G.711 (64 kbps) voice call with a packet size of 10 ms, and a receive jitter buffer that requires a minimum of 20 ms of voice (thus 2 packets) before it will begin playout.

Assume voice begins at time zero. After a nominal processing delay and a 10 ms packetization delay, the CODEC generates voice packets which are then transferred to the upstream transmit queue. The next Polled Request is used which results in the start of the Unsolicited Grants some time later. Additional Unsolicited Grants are immediately issued to clear out the upstream queue.

These packets traverse the network and arrive at the receive jitter buffer. The 20 ms minimum jitter buffer is met when the second packet arrives. Because the packets arrived close together, only an additional few milliseconds of latency has been added. After a nominal processing delay, playout begins.

When the voice spurt ends, the CM sends one remaining packet with no payload and with the active grants field of the UGSH set to zero grants. Some time later, UGS stops, and Real Time Polling begins.

The Unsolicited Grant Service (UGS) is designed to support real-time service flows that generate fixed size data packets on a periodic basis, such as Voice over IP. The service offers fixed size grants on a real-time periodic basis, which eliminate the overhead and latency of CM requests and assure that grants will be available to meet the flow's real-time needs. The CMTS MUST provide fixed size data grants at periodic intervals to the Service Flow. In order for this service to work correctly, the Request/Transmission Policy (refer to C.2.2.6.3 of DOCSIS) setting MUST be such that the CM is prohibited from using any contention request or request/data opportunities and the CMTS should not provide any unicast request opportunities. The Request/Transmission Policy must also prohibit piggyback requests. This will result in the CM only using unsolicited data grants for upstream transmission. All other bits of the Request/Transmission Policy are not relevant to the fundamental operation of this scheduling service and should be set according to network policy. The key service parameters are the Unsolicited Grant Size, the Nominal Grant interval, the Tolerated Grant Jitter and the Request/Transmission Policy. (Refer to Appendix M of DOCSIS).

The above description is a preferred embodiment only, and various features, such as the actual protocol used between the cable modem and the CMTS can vary without effecting the essential features of the present invention. Other protocols besides the DOCSIS protocol are possible between the cable modem and the CMTS. The present invention can also be applied to packet networks using a shared media other than cable, such as wireless or radio networks transmitting over shared electromagnetic waves. Even other shared media such as light or wave guides can be used in the present invention.

While specific embodiments of the invention have been shown and described in detail to illustrate the application of the principles of the invention, it will be understood that the invention may be embodied otherwise without departing from such principles.

What is claimed is:

1. A method for transmitting voice over cable modem networks, the method comprising the steps of:
   providing a cable modem (CM) and a cable modem termination system (CMTS) connected by a cable;
   initiating a voice call over said cable between a first user at said cable modem and a second user;
   detecting voice activity from said first user above a predetermined value;
   converting voice audio of said first user into digital voice packets when said voice activity is detected;
   transmitting said digital voice packets from said cable modem to said CMTS;
   blocking voice audio of said first user from said converting and transmitting when said voice activity is not detected;
   receiving said digital voice packets at said CMTS;
   transmitting from said CMTS to said second user said voice call as represented by said digital voice packets of said first user.

2. The method in accordance with claim 1, further comprising:
   providing another cable modem connected to said cable;
   initiating another voice call between another first user at said another cable modem and another second user over said cable, said voice call and said another voice call being time division multiplexed on said cable.

3. The method in accordance with claim 2, further comprising:
   detecting voice activity from said another first user above a predetermined value;
   converting voice audio of said another first user into additional digital voice packets when said voice activity of said another first user is detected;
   transmitting said additional digital voice packets from said another cable modem to said CMTS;
   blocking voice audio of said another first user from said another converting and transmitting when said voice activity of said another first user is not detected;
   receiving said additional digital voice packets at said CMTS;
   transmitting from said CMTS to said another second user said another voice call as represented by said additional digital voice packets of said another first user.

4. The method in accordance with claim 3, wherein:
   said digital voice packets and said additional voice packets are transmitted through said cable over a common channel and in different time slots.

5. The method in accordance with claim 1, wherein:
   said cable modem transmits non-voice data packets over said cable to said CMTS,
   said cable modem requests a time slot from said CMTS when said cable modem has one of said distal voice packets and said non-voice data packets;
   said cable modem transmits said one of said packets to said CMTS in said time slot.

6. The method in accordance with claim 5, wherein:
   said CMTS grants said cable modem a periodic stream of time slots when said CMTS learns of said voice activity at said cable modem;
   said CMTS discontinues said periodic stream of time slots when said CMTS learns of an end of said voice activity at said cable modem.

7. The method in accordance with claim 6, wherein:
   said CMTS regularly polls said cable modem to learn of time slot requests.

8. The method in accordance with claim 1, wherein:
   said cable modem indicates an amount of bandwidth needed for said digital voice packets to said CMTS within a voice data packet sent to said CMTS;
   said CMTS provides a periodic stream of time slots to satisfy said bandwidth needed.

9. The method in accordance width claim 1, wherein:
   said cable modem and said CMTS communicate according to DOCSIS 1.1 specification;
   said cable modem uses a piggy back bit of said DOCSIS specification when activity is detected;
   said CMTS grants said cable modem a periodic stream of time slots when said CMTS sees said piggyback bit.

10. The method in accordance with claim 9, wherein:
   said cable modem does not use said piggy back bit when no activity is detected;
   said CMTS stops said periodic stream of time slots when said CMTS sees said piggyback bit is not set.

11. The method in accordance with claim 1, wherein:
said cable modem and said CMTS communicate according to DOCSIS 1.1 specification;
said cable modem uses a contention area of said DOCSIS 1.1 specification for comfort noise of the voice call.

12. The method in accordance with claim 1, wherein:
said cable modem and said CMTS communicate according to DOCSIS 1.1 specification;
said cable modem uses a poll area of said DOCSIS 1.1 specification for comfort noise of the voice call.

13. A method for transmitting voice over shared media packet networks, the method comprising the steps of:
providing a transmitter and a receiver termination system connected by a shared media;
initiating a voice call over the shared media packet network between a first user at said transmitter and a second user;
detecting voice activity from said first user above a predetermined value;
converting voice audio of said first user into digital voice packets when said voice activity is detected;
said transmitter requesting a periodic stream of time slots in said shared media from said termination system when said voice activity is detected;
transmitting said digital voice packets from said transmitter to said termination system in said time slots;
blocking voice audio of said first user from said converting and transmitting when said voice activity is not detected;
said termination system discontinuing said periodic stream of time slots when said termination system learns of an end of said voice activity at said transmitter;
transmitting said voice call from said termination system to said second user.

14. A telephone cable modem arrangement over a shared medium, the arrangement comprising:
a telephone for receiving voice audio from a user;
a voice activity detection circuit for detecting voice activity at said telephone;
a coder/decoder for converting the voice audio into packets when said voice activity is detected, and blocking conversion of the voice audio when no voice audio is detected;
a cable modem for receiving the packets from said coder/decoder and transmitting the packets over the shared medium, said cable modem requesting a periodic stream of time slots in the shared medium when said voice activity is detected, said cable modem sending said packets onto the shared medium in said periodic stream of time slots, said cable modem terminating said periodic stream of time slots when said voice activity is not detected.

* * * * *